United States Patent
Tillmann et al.

(10) Patent No.: US 8,888,345 B2
(45) Date of Patent: Nov. 18, 2014

(54) THERMAL-EXPANSION COMPENSATOR AND HEADLAMP

(75) Inventors: Lars Tillmann, Lippstadt (DE); Dirk Schulte, Georgsmarienhütte (DE)

(73) Assignee: Hella KGAA, Lippstadt (DE)

( * ) Notice: Subject to any disclaimer, the term of this patent is extended or adjusted under 35 U.S.C. 154(b) by 155 days.

(21) Appl. No.: 13/372,918

(22) Filed: Feb. 14, 2012

(65) Prior Publication Data

US 2012/0320619 A1    Dec. 20, 2012

(30) Foreign Application Priority Data

Feb. 15, 2011 (DE) .................. 10 2011 000 735

(51) Int. Cl.
*B60Q 1/04* (2006.01)

(52) U.S. Cl.
USPC .......................... 362/549; 362/528; 362/547

(58) Field of Classification Search
USPC ......... 362/294, 373, 512–515, 523, 528, 547, 362/549
See application file for complete search history.

(56) References Cited

U.S. PATENT DOCUMENTS

| | | | | |
|---|---|---|---|---|
| 3,619,593 A * | 11/1971 | Hollis et al. | ................... | 362/467 |
| 6,190,030 B1 * | 2/2001 | Chase | ............................ | 362/549 |
| 6,321,022 B1 * | 11/2001 | DeBoynton | ................... | 385/140 |
| 6,478,456 B1 * | 11/2002 | Eichhorn et al. | .............. | 362/369 |
| 6,650,412 B1 * | 11/2003 | Slater | ............................. | 356/328 |
| 7,029,154 B2 * | 4/2006 | Arlon et al. | .................... | 362/507 |
| 7,390,114 B2 * | 6/2008 | Konig et al. | ................... | 362/523 |
| 7,517,121 B2 * | 4/2009 | Arlon et al. | .................... | 362/507 |
| 8,439,544 B2 * | 5/2013 | Seiger | ........................... | 362/548 |
| 2005/0077379 A1 * | 4/2005 | Augustin et al. | ............ | 239/102.2 |
| 2009/0255207 A1 * | 10/2009 | Schulte | ............................ | 52/706 |

FOREIGN PATENT DOCUMENTS

DE  102009035565  *  2/2011
EP  2280221 A2 *  2/2011

* cited by examiner

*Primary Examiner* — Y My Quach Lee
(74) *Attorney, Agent, or Firm* — Husch Blackwell LLP

(57) ABSTRACT

The invention relates to a thermal-expansion compensator for holding a light module in a housing of a headlamp for a motor vehicle, comprising a compensation pin extending along a pin axis with a stop element, wherein the compensation pin can be connected to the housing by means of a connecting means, a compensation element with a compensation body extending along a compensation axis and at least two stop receptacles that are each formed for holding the stop element of the compensation pin, and a holder that is arranged rigidly on the light module.

19 Claims, 7 Drawing Sheets

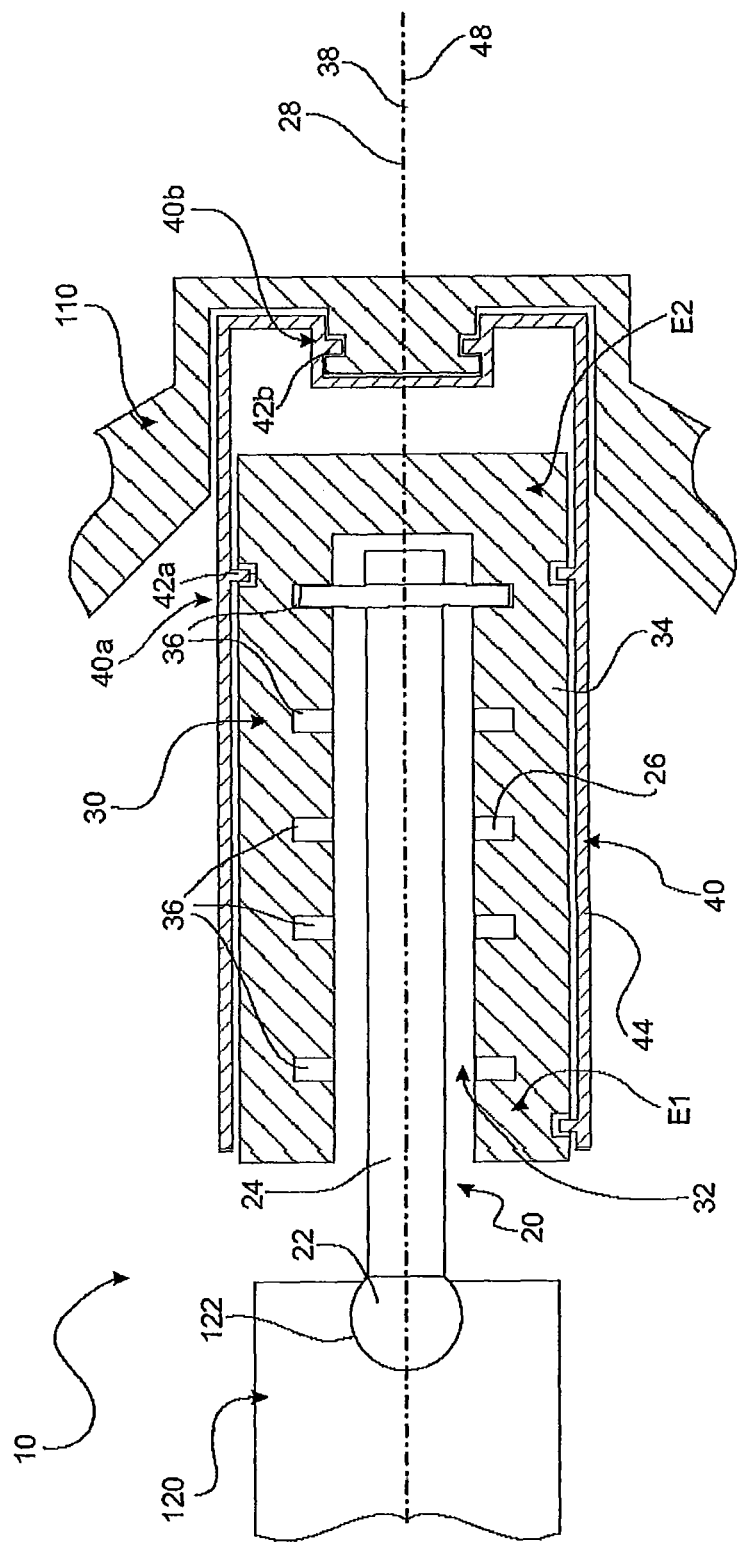

THERMAL-EXPANSION COMPENSATOR AND HEADLAMP

RELATED APPLICATIONS

This application claims priority and benefit to German Patent Application No. 102011000735.0, filed on Feb. 15, 2011, all of which is incorporated herein by reference.

BACKGROUND OF THE INVENTION

1. Field of the Invention

The present invention relates to a thermal-expansion compensator for compensating the thermal expansion of a headlamp unit of a light module. The present invention also relates to a corresponding light module.

2. Related Art

Light modules in headlamps are used for emitting light for illuminating the area in front of a vehicle, wherein the emitted light could be a low beam featuring a cut-off line. Here it is provided that the cut-off line of the low beam does not exceed a specified angle relative to the horizontal. However, the thermal behavior of the headlamp housing can lead to a not insignificant displacement of the cut-off line relative to the horizontal, because the receptacle element leaves its specified position due to the thermal expansion behavior of the housing, resulting in a tilting of the carrier frame and consequently a tilting of the light module, so that the cut-off line likewise leaves its specified angle or its specified height.

FEM simulations can be performed for overcoming impermissible tilting of the light module in the housing of the headlamp. However, numerical modeling of the complex thermomechanical behavior of a headlamp is often inadequate. An advantageous, thermomechanically stable arrangement of the receptacle elements for holding the light module in the housing of the headlamp can indeed minimize tilting of the light module, but disadvantageous thermal relationships of the housing can nevertheless lead to undesired tilting of the light module. For example, superimposing the thermal effect of the housing of the headlamp by the ambient temperature and also radiant heat from the engine forms a complex temperature field, so that thermal effects also on parts of the housing are taken into account only to a limited extent.

Thermal-expansion compensators for compensating the thermal expansion of a light module are generally known. They are used to compensate thermal expansions, that is, changes in geometry of a light module. When light modules are operating, they are subjected to different working temperatures. The temperatures and thermal-expansion coefficients of the materials being used produce different thermal expansions, that is, different geometrical dimensions for the headlamp unit.

SUMMARY OF THE INVENTION

One goal in modern light modules is to produce the most exact light distribution possible on the street in front of a vehicle. In particular, a so-called horizontal cut-off line (hHDG), as well as a vertical cut-off line (vHDG), which separate an illuminated area from a non-illuminated area, can be generated in this way. The more precisely this cut-off line can be positioned, the more precisely these cut-off lines can increase the illuminated area, without the risk of blinding a driver possibly coming from the opposite direction. In other words, the illuminated area could be moved closer to an area that would blind a driver coming from the opposite direction. This method improves the illumination of the street and thus the viewing conditions at night. Such a control system, however, requires the most exact construction possible, that is, an especially low-play construction, and the lowest possible tolerances for the drive system, that is, the adjustment system of the headlamp unit, in particular, of a light source in the headlamp unit.

Because the entire headlamp unit changes with respect to its geometrical dimensions due to thermal expansion when temperatures fluctuate, the geometric boundary conditions for regulating the respective cut-off line also change. In other words, the origin for the adjustment system shifts within the absolute coordinate system for the positioning of the respective cut-off line on the street.

Taking into account the thermal changes for the control or the regulation with respect to the positioning of the cut-off line has the disadvantage that it requires, on one hand, particularly precise sensors, especially temperature sensors, and also particularly fine driving of the actuators of the headlamp unit. It has already been proposed to use mechanical compensators, that is, compensators that exhibit thermal expansion in a headlamp, with this thermal expansion being directed opposite the relevant thermal expansion when the light module is in use. In this way, when the temperature changes, a complementary thermal expansion of a thermal-expansion compensator can compensate the corresponding thermal expansion of the light module.

In these known thermal-expansion compensators, it is disadvantageous that each of these must be developed specifically for the respective headlamp. Thus, for one, the respective geometric relationships in the headlamp must be taken into account and, second, the necessary compensating thermal expansion must be calculated exactly and incorporated in the material selection and geometry of the respective thermal-expansion compensator. In other words, each new development or each vehicle with specific headlamps requires a separate, newly designed thermal-expansion compensator. This increases, for one, the product diversity and thus the complexity of the headlamp system and, second, the development and production costs.

Therefore the task of the present invention is to solve the disadvantages named above. In particular, the task of the present invention is to disclose a thermal-expansion compensator that can be used as universally as possible and allows large structural play for the light module due to the most compact construction possible.

The preceding task is solved by a thermal-expansion compensator for holding a light module in a housing of a headlamp for a motor vehicle, said thermal-expansion compensator comprising: a compensation pin extending along a pin axis with a stop element, said compensation pin being connectable to housing with a connecting element; a compensation element with a compensation body extending along a compensation axis and at least two stop receptacles that are each constructed for holding said stop element of said compensation pin; and a holder, said holder being disposed relative to the light module, such that said compensation body of said compensation element is fixed with one end on said holder such that said compensation body of said compensation element can expand or contract freely in said holder along said compensation axis; and wherein said compensation pin extends into said compensation element and can be held selectively in one of said at least two stop receptacles of said compensation element to form an effective expansion length, and also by a headlamp with such a thermal expansion compensator. Advantageous embodiments can be taken, among other things, from the subordinate claims following the independent claims. Additional features and details of the invention can be taken from the subordinate claims, the description, and the drawings. Here, features and details that are described in connection with the component according to the invention are obviously also applicable in connection with the method according to the invention and vice versa, so that, with respect to the disclosure, continuously alternating reference is made or could be made to the individual aspects of the invention.

A thermal-expansion compensator according to the invention for holding a light module in a housing of a headlamp for a motor vehicle has a compensation pin extending along a pin axis with a stop element, wherein the compensation pin can be connected to the light module by means of a connecting means. Furthermore, a compensation element is provided with a compensation body extending along a compensation axis and at least two stop receptacles that are each constructed for holding the stop element of the compensation pin. A holder is also arranged rigidly on the light module. In a thermal-expansion compensator according to the invention, the compensation body of the compensation element is fixed with one of its two ends on the holder such that the compensation body of the compensation element can expand and/or contract freely in the holder along the compensation axis. Furthermore, the compensation pin extends into the compensation element and can be held selectively in one of the at least two stop receptacles of the compensation element for forming an effective expansion length.

By providing at least two stop receptacles, when the thermal-expansion compensator is installed, its expansion length can be selected. When the headlamp is installed, it is also possible to adapt the expansion length of the thermal-expansion compensator to the specifications of the headlamp, without having to use another, specifically constructed thermal-expansion compensator. In other words, a thermal expansion compensator according to the invention can be used in this way more flexibly and, above all, more universally for a plurality of different headlamps. The expansion length is produced between the fixing of the compensation element on the holder and the position of the held stop element of the compensation pin.

Obviously, a thermal-expansion compensator according to the invention could also be arranged in the reverse direction between the light module and the housing, so that the connecting means is formed for connecting to the light module and the holder for the rigid arrangement on the housing of the headlamp.

In one embodiment of a thermal-expansion compensator according to the invention, the connecting means is formed as a spherical head for insertion into a spherical socket of the housing and the compensation pin has a pin body extending along the pin axis and the stop element. The stop element extends perpendicular to the pin axis and is spaced apart from the spherical head. In particular, the stop element can be formed integrally with the pin body. At a minimum, the stop element is arranged on the pin body.

Furthermore, a thermal-expansion compensator of this embodiment according to the invention has the compensation element with a compensation body extending along the compensation axis and at least two stop receptacles. The stop receptacles are formed for holding the stop element. This means that the stop element of the compensation pin can be held in the stop receptacle of the compensation element. Here, "holding" means a geometric correspondence, at least in some regions, between the stop element on one hand and the stop receptacle on the other. The stop receptacle can be formed, for example, as a groove in which a projection in the form of the stop element can engage.

In addition, in a thermal-expansion compensator of this embodiment according to the invention, the holder is provided that has a holder body extending along a holder axis and is provided with a module fastening means for fixing the holder on the light module and also a compensation-element fastening means for fixing the holder on the compensation element. The module fastening means and the compensation-element fastening means are here spaced apart from each other with respect to the holder axis. The holder is made, in particular, from sheet metal, because this has an especially low thermal-expansion coefficient.

In one thermal-expansion compensator of this embodiment according to the invention, the stop element is held in one of the stop receptacles so that relative movement between the compensation element and the compensation pin along the pin axis and/or the compensation axis is prevented. In other words, such axial movement is not permitted, so that a transfer of forces is possible in this axial direction between the compensation element and the compensation pin. This can be realized, for example, through a positive fit at least in some regions between the stop element and the stop receptacle. In this way it is guaranteed that this relative movement is essentially prevented, in particular, it lies below the tolerances necessary for production. Preventing relative movement is thus to be understood technically and relative movements, that is, play in a specified tolerance range, are definitely permissible. Here, a relative movement in both directions along the defined axes is prevented, so that forces can also be transferred in both directions.

The functioning of a thermal-expansion compensator according to the invention is to be described as follows using an example:

The thermal-expansion compensator can be fixed on one side by means of its connecting means, for example, in a spherical receptacle, for example, in a receptacle element of a headlamp. On the opposite side, that is, the side of the holder on which, for example, a module fastening means can be provided as an interface, the thermal-expansion compensator is fixed on the light module. The intermediate section of the thermal-expansion compensator thus can compensate for thermal expansion in the light module due to a change in length along one of its axes, that is, the pin axis, the compensation axis, or the holder axis.

In particular, the compensation element is responsible for the thermal compensation. Thus, when the temperature changes, the thermal-expansion coefficient of the material, in particular, of the compensation element, changes the axial extent of this compensation element. By changing the axial extent and also by fixing the connecting means, in particular, of the spherical head of the compensation pin, in the corresponding spherical receptacle in a headlamp, the change in length along the respective axis is transferred by means of the compensation element and the holder to the light module. According to the direction of the length variation, that is, as a function of whether the temperature increases or decreases, the holder, in particular, a module fastening means, is likewise shifted along the axis. In this way, it is possible to shift the linkage point, that is, the bearing point between the thermal-expansion compensator and the light module. Here, the bearing point is shifted opposite the shifting of the light module caused by its own thermal expansion due to the identical change in temperature.

In other words, a change in temperature causes, on one hand, a thermal expansion of the light module and, on the other hand, a thermal expansion of the thermal-expansion compensator. The two thermal expansions are essentially complementary to each other, so that as a whole the two thermal expansions essentially cancel out and the headlamp unit remains at the desired predefined position. Due to this fact, the thermal expansion of the headlamp unit does not have to be taken into account, or only to a smaller degree, in the control/regulation of the position of the respective cut-off line, so that the necessary control logic can have a simpler construction and, in particular, temperature sensors can be eliminated.

The fastening means of the holder of one embodiment of the present invention can involve, in particular, latching connections, for example, clamps. These could be formed such that they remain latched in the provided position after docking in this position, that is, after fixing the holder on the light module or on the compensation element, and can be removed only by destroying the holder or the respectively connected element.

It can be advantageous if, in a thermal-expansion compensator according to the invention, the end of the compensation body of the compensation element facing the rigid arrangement of the holder on the light module is fixed on the holder. In other words, the linkage between the compensation element and the holder lies in the vicinity of the linkage of the holder to the light module. Alternatively, it is also possible that the end of the compensation body of the compensation element facing away from the rigid arrangement of the holder on the light module is fixed on the holder. According to the specific space requirements, a fitting thermal-expansion compensator can be created in this way. In particular, it is possible that the fixing of the compensation element on the holder can also be selected freely between these two alternatives when the thermal-expansion compensator is installed. Thus, in particular, the effective direction of the thermal-expansion compensator can be defined and the flexibility of a thermal-expansion compensator according to the invention can be further increased.

It is also possible that the compensation element has an essentially multiple-shell, in particular, two-shell, construction, so that an especially simple installation is possible by putting the pieces together. This is the case especially when the compensation element involves two half-shells in whose interior the stop element of the compensation pin can be held. In such an embodiment, the stop receptacle is also formed in the interior of this respective shell of the compensation element.

In the scope of the present invention, it is possible that the stop element and also the respective stop receptacle are provided partially or even completely in the circumferential direction around the compensation pin or the compensation element. It is also possible that the stop receptacle is essentially larger than the stop element of the compensation pin, but nevertheless sufficiently prevents relative movement between the compensation pin and the compensation element.

It can be advantageous if, in a thermal-expansion compensator according to the invention, all of the axes, that is, the pin axis and/or the compensation axis and/or the holder axis, are parallel, in particular, coaxial, to each other. In particular, the coaxial arrangement of the axes named above has the advantage that the entire thermal-expansion compensator can have an even more compact construction. The three-part construction of the compensation pin, compensation element, and holder allows a nested construction of the thermal-expansion compensator that permits, in principle, an especially compact form for this compensator. Despite this compactness, the arrangement of the fastening means in corresponding embodiments in a state spaced apart from each other and the distance between the spherical head and the compensation stop produces a relatively large expansion length with respect to the thermal-expansion compensation. Thus, the necessary expansion length can be provided despite the compact construction, so that a large structural expansion space remains with respect to the necessary space requirements for a thermal-expansion compensator according to the invention in a headlamp.

In a headlamp, a housing is advantageously provided in which, for example, one or more light sources are provided. These light sources can be influenced by means of actuators, for example, by means of different optical systems, such as reflectors, lenses, or mirror systems with respect to their beam path and in this way a control/regulation of the position of the cut-off line in front of the vehicle can be varied with such a headlamp unit. The light modules are advantageously provided in a stable holder frame that is provided for this purpose and is likewise part of the light module and is used as an interface to the housing of the vehicle.

It can be advantageous if, in a thermal-expansion compensator according to the invention, at least two stop receptacles are present in the compensation body and these receptacles are spaced apart from each other with respect to the compensation axis. Providing at least two stop receptacles has the advantage that it further increases the variability of a thermal-expansion compensator according to the invention. Thus, different compensation pins with differently positioned stop elements can be used, in order to achieve different expansion lengths of the thermal-expansion compensation. Thus it is possible that the same construction of the thermal-expansion compensator can be used for a plurality of different headlamps. This allows at least identical holders and compensation elements to be provided for all variations of a wide range of different headlamps and the desired expansion length to be set when the headlamp is installed through the variable selection of the compensation pins that are also very similar to each other. This method increases the possible quantities for the thermal-expansion compensator and considerably reduces the parts costs. Thus, for each light module of a headlamp, the thermal-expansion compensator according to the invention is used and the expansion length desired for the specific case is provided for the thermal-expansion compensation through the selection of the compensation pin, in particular, with the specific position of the stop element.

Likewise it is advantageous when, in a thermal-expansion compensator according to the invention, the compensation stop essentially completely surrounds the pin body radially with respect to the pin axis. Completely surrounding the pin has the advantage that a relatively small extent of the compensation stop is possible in the radial direction. Surrounding the pin body, especially in a pin body with a round cross section, thus has the advantage that despite a smaller radial extent and an associated particularly compact form, a sufficient force transfer area is provided, so that the relative movement between the compensation pin and component element can be prevented according to the invention.

Furthermore, it can be advantageous if, in a thermal-expansion compensator according to the invention, the compensation pin has a profiled, in particular, cylindrical, pin body and a spherical head that is used as a connecting means to the light module. The construction of the connecting means as a spherical head has the advantage that this connection cannot transfer bending moments at least in large swiveling ranges. In this way, it is possible that no twisting due to relative movements between the light module and the housing of the headlamp can be produced during the thermal compensation. The longevity of the thermal compensator is significantly improved in this way.

It is likewise advantageous if, in a thermal-expansion compensator according to the invention, the stop element is arranged inclined on the pin body, in particular, inclined by 90° relative to this pin body. This inclined arrangement allows an improved transfer of forces that are directed essentially along the pin axis and/or the compensation axis.

It is also advantageous if, in a thermal-expansion compensator according to the invention, the materials of the compensation element and of the holder have different thermal-expansion coefficients. In particular, the compensation element has a thermal-expansion coefficient that is associated with relatively large thermal expansion. The holder itself is advantageously provided with a lower thermal-expansion coefficient and is made, for example, from sheet metal. The compensation element itself can be produced, for example, from plastic.

It is likewise advantageous if, in a thermal-expansion compensator according to the invention, the compensation element has at least in some regions a cavity along the compensation axis, wherein at least the section of the pin body on which the stop element is arranged extends into this cavity. Furthermore, the at least one stop receptacle is arranged in this cavity. The internal arrangement of the section of the compensation pin has the advantage that this is particularly well protected. In addition, in this way the volume of the compensation element is used simultaneously for holding the pin, so that the dimension allows, especially in the radial direction, an even more compact form. The further increased compactness produces greater play and, associated with this greater play, greater structural freedom in the use of a thermal-expansion compensator according to the invention.

It is also advantageous if, in a thermal-expansion compensator according to the invention, the module fastening means and the compensation-element fastening means are arranged on the two opposite end sections of the holder with respect to the holder axis. In this way, an especially large expansion length can be achieved with respect to the thermal expansion of the holder. In this way, the length of the compensation element is also increased with respect to the variation of the effective length of the compensation element, because essentially one end of the compensation element is fixed by the compensation-element fastening means, so that the rest of the compensation element is provided, with respect to its extent, along the compensation axis for the thermal-expansion compensation. Starting from this fixed point for the thermal expansion, when the thermal-expansion compensator is installed, the user can still select in which stop receptacle he or she will insert the stop element, so that, in this way, variability of the effective length of the thermal expansion of the compensation element can be achieved.

It can also be advantageous if, in a thermal-expansion compensator according to the invention, the compensation pin is formed integrally and consists of a single material. In particular, the compensation pin has a monolithic construction. Thus, the compensation pin can be produced, for example, from metal and can be manufactured through metal-cutting processing, in particular, as a rotating and rotationally symmetric turned part.

It can also be advantageous if, in a thermal-expansion compensator according to the invention, the compensation pin is formed rotationally symmetric with respect to the pin axis and/or the compensation element is formed rotationally symmetric with respect to the compensation axis and/or the holder is formed rotationally symmetric with respect to the holder axis. In addition to the simplified production, for example, through metal-cutting and turning work, the rotationally symmetric construction also produces a reduction of undesired shear stresses in the respective elements. In addition, the necessary use of materials and the costs associated with these materials decrease. The compactness of the entire thermal-expansion compensator can also be increased by such a construction.

Another object of the present invention is a headlamp for a motor vehicle with a housing in which at least one light module is held in a predetermined position, wherein a thermal-expansion compensator of the present invention is arranged between the housing and the light module for supporting this light module in the housing. A corresponding headlamp is associated with the same advantages as explained in detail above through the use of a thermal-expansion compensator according to the invention.

In a headlamp according to the invention, it can be advantageous if the light module is held in the headlamp by means of a carrier frame and if the thermal-expansion compensator is arranged between the carrier frame and the housing. In such a case, the carrier frame forms, as part of the light module, the interface to the thermal-expansion compensator. It is also advantageous if three receptacle elements are arranged between the carrier frame and the light module, in order to form a mounting plane for holding the light module. The three attachment points of the light module on the housing of the headlamp define the mounting plane that simultaneously also represents the coordinate system with respect to which the thermal compensation is realized. Another advantage is when two of the receptacle elements have a high stiffness and one of the receptacle elements is formed at least partially from the thermal-expansion compensator. In this way, thermal compensation that is able to compensate rotation about an axis of the reference coordinate system can be performed in a targeted way.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will be explained in more detail with reference to the accompanying figures in the drawing. The terms "left," "right,", and "below" used here refer to the figures in the drawing being oriented so that the reference symbols can be read normally. Shown schematically are.

DETAILED DESCRIPTION OF THE PREFERRED EMBODIMENT

Figure 1:
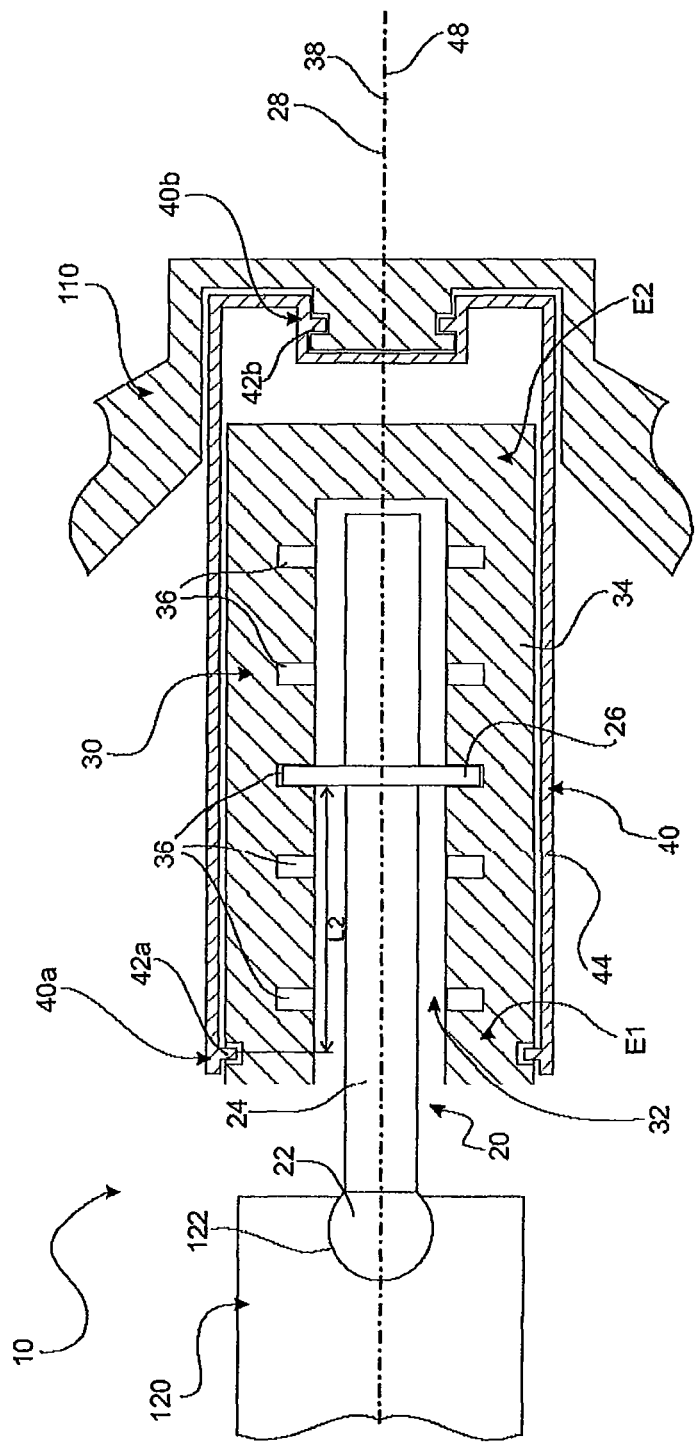
FIG. 1 a first embodiment of a thermal compensator according to the invention, FIG. 2 the thermal compensator of FIG. 1 with a different compensation pin, FIG. 3 the thermal compensator of FIGS. 1 and 2 with a different compensation pin, FIG. 4 an embodiment of a holder frame, FIG. 5 an embodiment of a light module, and FIG. 6 in schematic cross section, the light module of FIG. 5, FIG. 7 a second embodiment of a thermal compensator according to the invention.

In FIG. 1, a first embodiment of a thermal compensator 10 according to the invention is shown. This has a compensation pin 20 that has, on its left end, a connecting means 22 in the form of a spherical head in a spherical socket 122 of a housing 120. Furthermore, the compensation pin 20 is provided with a pin body 24 that extends along the pin axis 28. The compensation pin 20 involves an essentially rotationally symmetric component that is also provided with a stop element 26 spaced apart from the connecting means 22. This stop element 26 is held in a stop receptacle 36 of a compensation element 30, so that a relative movement between the compensation pin 20 and the compensation element 30 is essentially prevented. The pin body 24 here extends, in some sections, in a cavity 32 of the compensation element 30. As is to be taken from FIG. 1, a plurality of stop receptacles 36, namely five, is provided in the compensation element 30, so that the stop receptacle position of the stop element 26 can vary, as still to be explained below with respect to FIGS. 2 and 3.

In the embodiment of the thermal-expansion compensator 10 of FIG. 1, a holder 40 is provided that is fixed on one end E1 of the compensation element 30 by means of a snap-on latching connection of a compensation-element fastening means 42a on one end section 40a of the holder 40. On the essentially opposite end, namely the end section 40b of holder 40, the holder 40 is fastened on a light module 110 by means of module fastening means 42b also as a snap-on latching connection.

Figure 2:
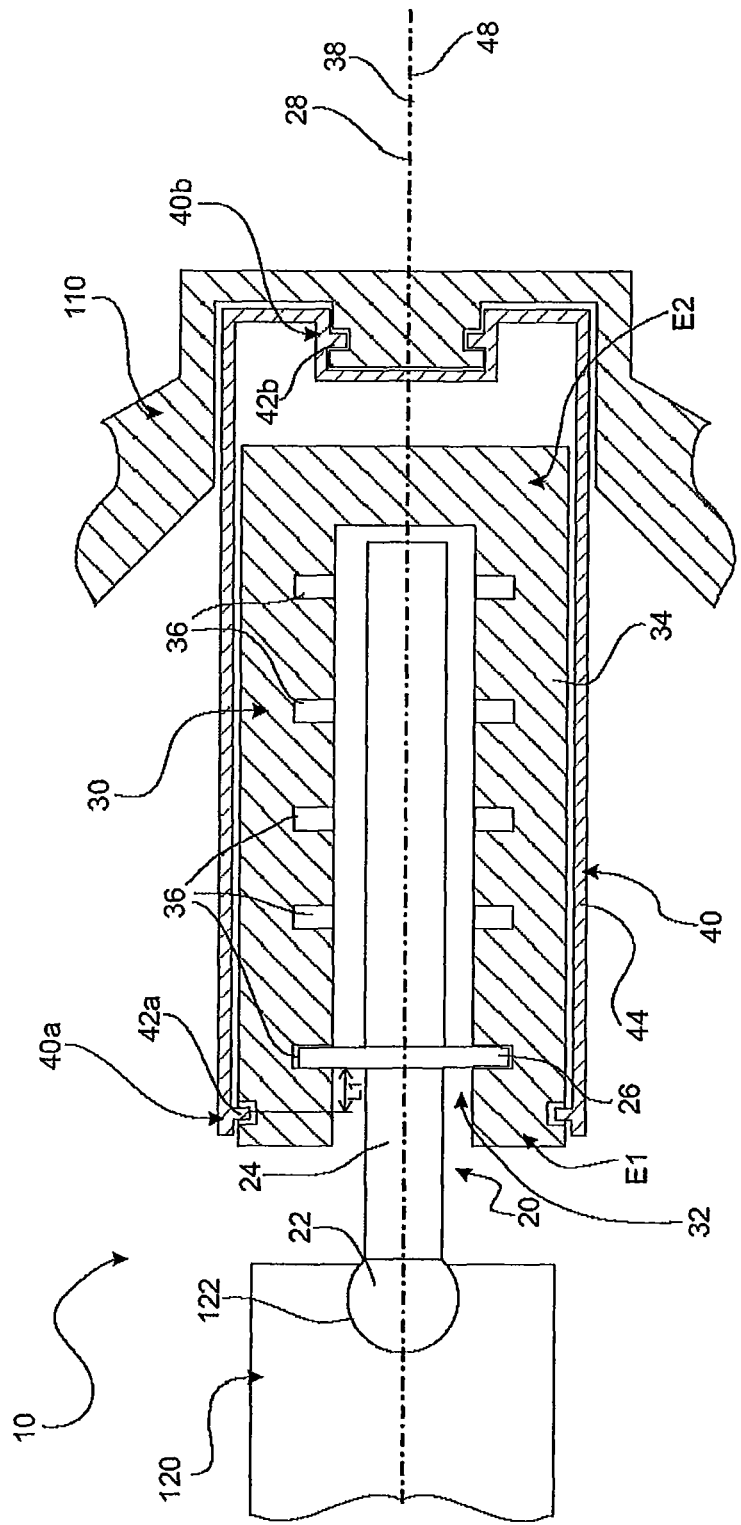
Figure 3:
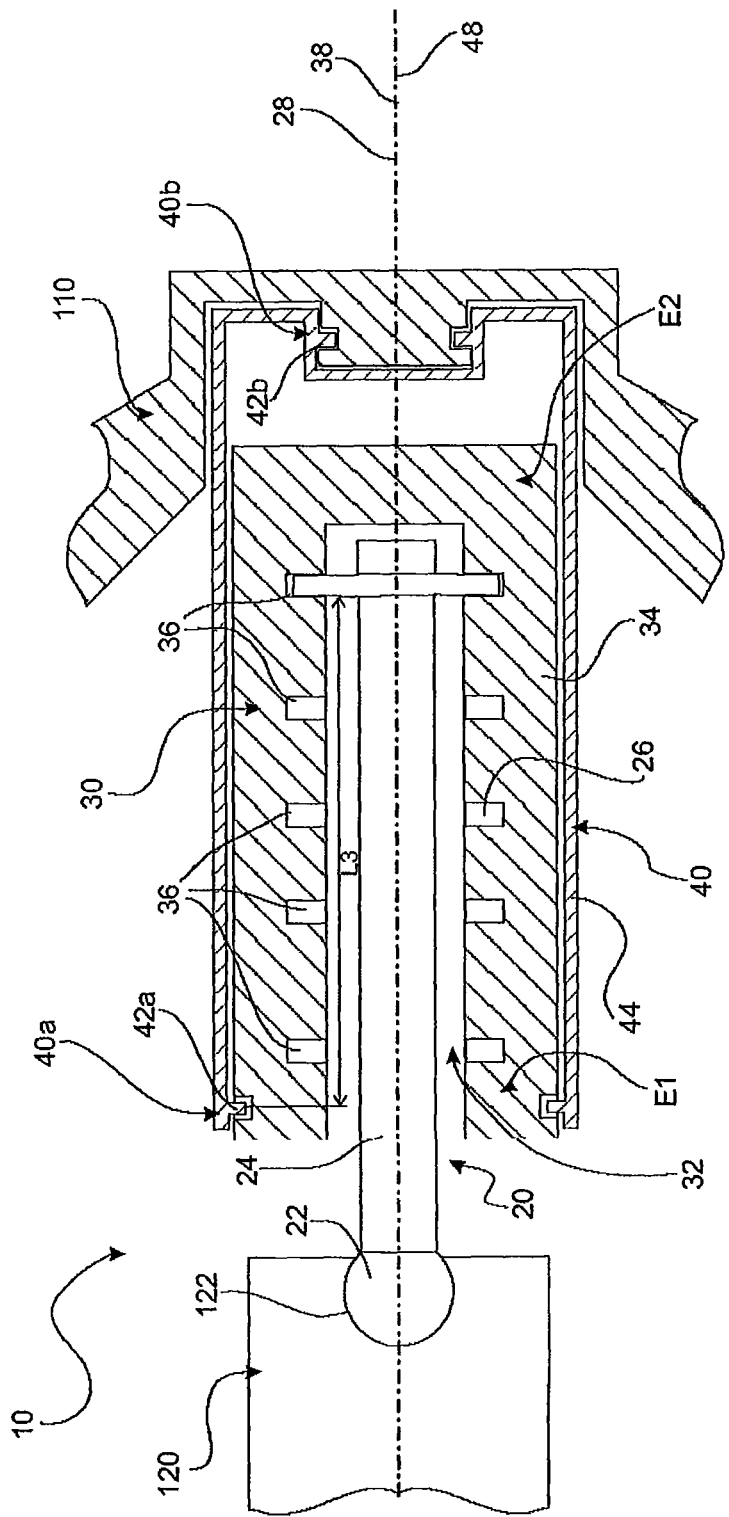

FIGS. 2 and 3 show alternative embodiments, wherein the compensation element 30 and the holder 40 are each identical in all three figures. Identical components are therefore also provided with identical reference symbols and their explanation will not be repeated. The respective compensation pins 20 in the embodiments of FIGS. 1 to 3 are also very similar, and their difference can be recognized only in the different positions of the stop element 26. According to where the stop element 26 of the compensation pin 20 is located, after the installation of the thermal-expansion compensator 10, it also engages in a different stop receptacle 36 of the compensation element 30. Different expansion lengths L1, L2, and L3 of the compensation element 30 are predefined according to the position of this engagement.

The function of a thermal-expansion compensator 10 according to the embodiments of FIGS. 1 to 3 will be explained below.

If the temperature changes, in particular, the material temperature of the individual components, for example, due to an increase in the outside temperature, then the respective geometric dimensions, in particular, the axial extent of the compensation element 30, also change in the direction of the compensation axis 38. Changing the axial extent of the compensation element 30 also changes, among other things, the distance between the position at which the compensation-element fastening means 42a of the holder 40 fixes this holder with the compensation element 30 and the position at which the stop element 26 is held in a stop receptacle 36.

If the temperature increases, then the length of the compensation element 30 increases and thus also the distance mentioned above, which is also designated as expansion length L1, L2, L3. The increase of this expansion length L1, L2, L3, that is, of the defined distance, has the result that stress appears in the material and this stress is relieved through movements to achieve force equilibrium. If the compensation pin 20 is now fixed in a spherical receptacle 122 as in the embodiment of FIG. 1, then the compensation pin 20 cannot move, so that an increase in the expansion length L1, L2, L3 between the stop receptacle 36 in which the stop element 26 is held and the corresponding fastening point to the holder 40 results in that this fastening point of the compensation-element fastening means 42a shifts toward the left in FIG. 1. In other words, the opposite fastening point of the light module 110, that is, the position of the module fastening means 42b, is also moved toward the left in FIG. 1. Thus, the bearing point of the light module 110 is compensated toward the left in FIG. 1.

An expansion of the light module 110, however, results in a thermal expansion that moves the light module toward the right when the temperature increases. The complementary directions of the respective thermal expansions thus have the result that, in the sum of the two complementary thermal expansions, there is essentially no shift of the light module 110 itself, in particular, of the control device arranged therein for a light source. The thermal change and the thermal expansion associated with this change are thus compensated by a thermal-expansion compensator 10 according to the invention.

In addition to the especially compact construction of a thermal compensator 10 according to the invention, the high flexibility with respect to insertion is easy to recognize in FIGS. 1 to 3. Thus, the desired effective length can be changed through slight changes, namely by just changing the position of the stop element 26 of the compensation pin 20.

Thus, in the use of a compensation pin 20 with a stop element 26 according to FIG. 2, an especially short expansion length L1 is defined, while in the embodiment of the thermal-expansion compensator 10 in FIG. 3, the maximum expansion length L3 can be used. As the expansion length L1, L2, L3 becomes longer, the difference, that is, the linear expansion provided for thermal-expansion compensation when the temperature changes, also increases. Thus, the desired expansion length L1, L2, L3 or the required calculated expansion length for the specific light module 110 can be provided through the corresponding selection of the position of the stop element 26, that is, the selection of the receptacle in the respective stop receptacle 36 in the compensation element 30. The same thermal-expansion compensator 10 can be produced in especially large quantities and used for a wide range of different headlamps 100. According to the installation situation, in addition to the flexibility and the reduced production costs due to the increased quantities, it must also be taken into account that the installation is simplified to the extent that the installation steps always remain the same irrespective of the actual position of the compensation pin, that is, of the stop element 26 within a stop receptacle 36 of the compensation element 30. The requirements for installation are thus significantly lower in comparison with known thermal-expansion compensators.

Figure 4:
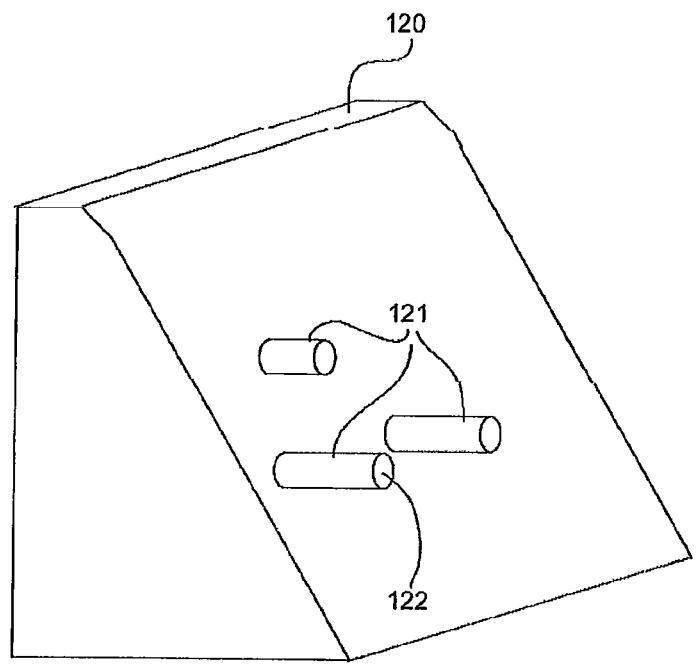
Figure 5:
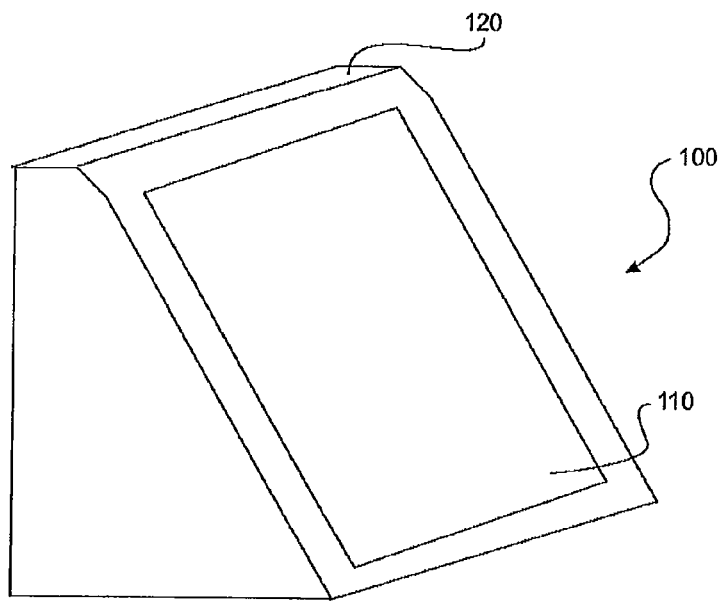
Figure 6:
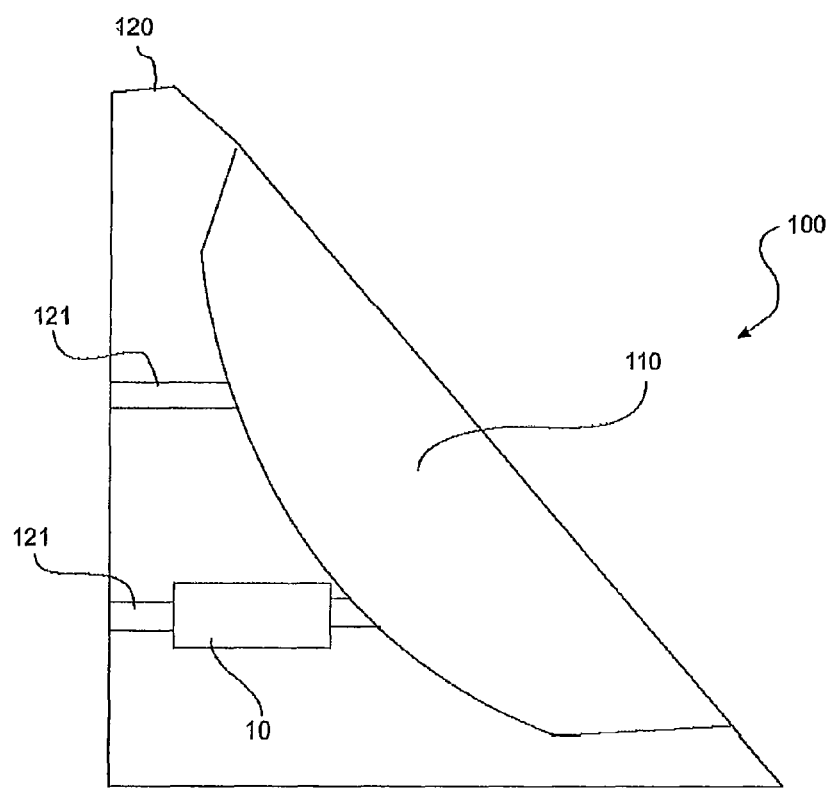

FIGS. 4 to 6 show an embodiment of a headlamp 100 according to the invention and the method how this is mounted. FIG. 4 shows the housing 120 of a headlamp 100 that has three receptacle elements 121. In one of these three receptacle elements 121, a spherical socket 122 is provided for holding a connecting means 22 in the shape of a spherical head of a compensation pin 20. This spherical socket 122 holds a thermal-expansion compensator 10 according to the invention, for example, according to the embodiment in FIGS. 1 to 3. If a light module 110 is inserted into the housing 120, then this light module 110 must be supported in the housing 120. This is realized in the embodiment of FIGS. 4 to 6 at three bearing points, namely in the receptacle elements 121. As can be easily recognized schematically in FIG. 6, a thermal-expansion compensator 10 of the present invention, in particular, according to the embodiment of FIGS. 1 to 3, is inserted into one of the three receptacle elements 121. This is provided between the receptacle elements 121 and the light module 110, so that it can carry out thermal-expansion compensation in the way explained in detail above.

If the geometric dimensions of the light module 110 now change due to thermal variation, for example, due to an increase in temperature, then the thermal-expansion compensator 10 will behave as explained above. The complementary direction of each change due to thermal expansion produces an essentially constant position of the light module 110, in particular, of the light source components and the actuator mechanism for the light source contained in this light module. The thermal-expansion compensator 10 is thus used for greatly simplifying the position of a cut-off line generated by a light source in a light module 110. In particular, a headlamp 100 according to the present invention requires no additional sensors monitoring the exact temperature of the headlamp 100. Instead, an automatic thermal-expansion compensation takes place, which could also be called mechanical compensation and is associated with very low error susceptibility and very low control/regulation complexity.

In FIG. 7, a second embodiment of a thermal compensator 10 according to the invention is shown. In this embodiment of the thermal-expansion compensator 10, the holder 40 is fixed by means of a snap-on connection of the compensation-element fastening means 42a in the vicinity of the end E2 of the compensation element 30. On the same end E2, the holder 40 is fixed on the light module 110 by means of the module fastening means 42b also as a snap-on latching connection. In this embodiment of the thermal-expansion compensator 10 or the fixing of the compensation element 30 on the holder 40, a maximum expansion length of the thermal-expansion compensator 10 can be used for thermal-expansion compensation. An expansion of the light module 110 here has the result that the compensation pin 20 is shifted to the left. This leads to an increase in the distance of the housing 120 to the light module 110.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A thermal-expansion compensator for holding a light module in a housing of a headlamp for a motor vehicle, comprising:
 a compensation pin extending along a pin axis with a stop element, said compensation pin being connectable to a housing with a connecting element;
 a compensation element with a compensation body extending along a compensation axis and at least two stop receptacles that are each constructed for holding said stop element of said compensation pin; and
 a holder, said holder being disposed relative to the light module, such that said compensation body of said compensation element is fixed with one end on said holder such that said compensation body of said compensation element can expand or contract freely in said holder along said compensation axis; and
 wherein said compensation pin extends into said compensation element and can be held selectively in one of said at least two stop receptacles of said compensation element to form an effective expansion length.

2. The thermal-expansion compensator according to claim 1, wherein said end of said compensation body of said compensation element facing towards said holder on the light module is fixed on said holder.

3. The thermal-expansion compensator according to claim 1, wherein said end of said compensation body of said compensation element facing away from said holder on the light module is fixed on said holder.

4. The thermal-expansion compensator according to claim 1, wherein said at least two stop receptacles are spaced apart from each other in said compensation body with respect to said compensation axis.

5. The thermal-expansion compensator according to claim 1, wherein said connecting element includes having a profiled pin body and a spherical head.

6. The thermal-expansion compensator according to claim 5, wherein said stop element is inclined on said pin body.

7. The thermal-expansion compensator according to claim 5, wherein said stop element substantially completely surrounds said pin body in a circumferential direction with respect to said pin axis.

8. The thermal-expansion compensator according to claim 1, wherein said compensation element and said holder are composed of materials having different thermal-expansion coefficients.

9. The thermal-expansion compensator according to claim 1, further comprising a cavity in said compensation element along said compensation axis, wherein at least a section of said compensation pin having one of said stop element or said at least one stop receptacle, extends into said cavity.

10. The thermal-expansion compensator according to claim 1, wherein said compensation pin is formed integrally and consists of a single material.

11. The thermal-expansion compensator according to claim 1, wherein said compensation pin is rotationally symmetric with respect to the pin axis.

12. The thermal-expansion compensator according to claim 5, wherein said profile is substantially cylindrical.

13. The thermal-expansion compensator according to claim 6, wherein said incline is about 90°.

14. The thermal-expansion compensator according to claim 1, wherein said compensation element is substantially rotationally symmetric with respect to said compensation axis.

15. The thermal-expansion compensator according to claim 1, wherein said holder is formed substantially rotationally symmetric with respect to its holder axis.

16. A headlamp for a motor vehicle with a housing in which at least one light module is held in a predetermined position, comprising:
 a thermal-expansion compensator disposed between a housing and a light module for storing said light module in said housing, said thermal-expansion compensator comprising:
 a compensation pin extending along a pin axis with a stop element, said compensation pin being connectable to said housing with a connecting element;
 a compensation element with a compensation body extending along a compensation axis and at least two stop receptacles that are each constructed for holding said stop element of said compensation pin; and
 a holder, said holder being disposed relative to the light module, such that said compensation body of said compensation element is fixed with one end on said holder such that said compensation body of said compensation element can expand or contract freely in said holder along said compensation axis; and
 wherein said compensation pin extends into said compensation element and can be held selectively in one of said at least two stop receptacles of said compensation element to form an effective expansion length.

17. The headlamp according to claim 16, further comprising a carrier frame disposed to hold said light module in said headlamp, said thermal-expansion compensator being arranged between said carrier frame and said housing.

18. The headlamp according to claim 16, wherein said three receptacle elements are arranged between said carrier frame and said light module, said three receptacle elements being a mounting plane for holding said light module.

19. The headlamp according to claim 18, wherein two of said receptacle elements have a high stiffness and one of said receptacle elements is formed at least partially from the thermal-expansion compensator.

* * * * *